(No Model.)
H. TRASK.
HANGER FOR PIPES.
No. 379,425. Patented Mar. 13, 1888.
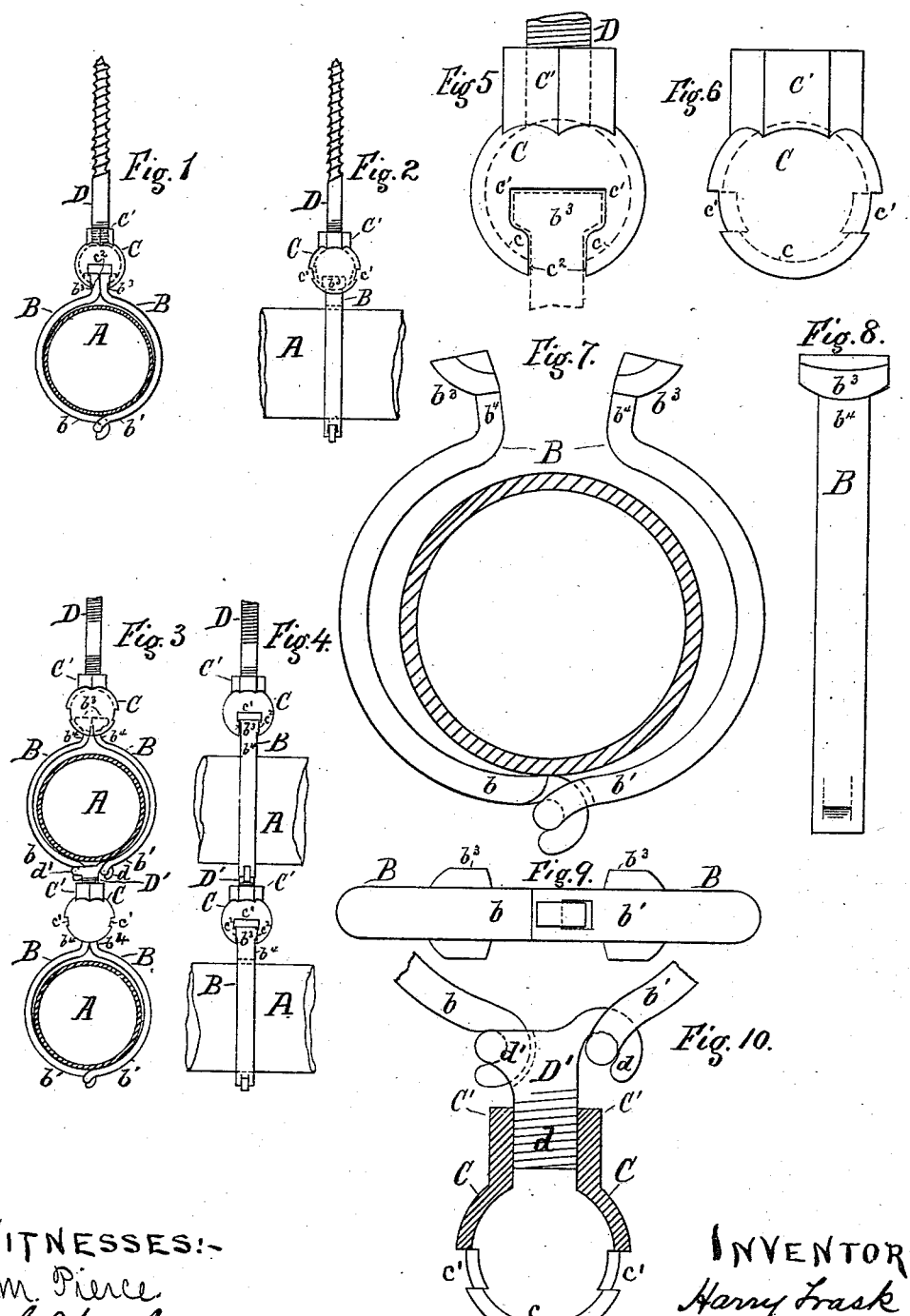
WITNESSES:-
A. M. Pierce
C. C. Weightman
INVENTOR:-
Harry Trask,
per Wm. H. Weightman
Atty

UNITED STATES PATENT OFFICE.

HARRY TRASK, OF BROOKLYN, NEW YORK.

HANGER FOR PIPES.

SPECIFICATION forming part of Letters Patent No. 379,425, dated March 13, 1888.

Application filed June 18, 1887. Serial No. 241,709. (No model.)

*To all whom it may concern:*

Be it known that I, HARRY TRASK, a citizen of the United States, residing in Brooklyn, Kings County, and State of New York, have invented certain new and useful Improvements in Hangers for Piping, of which the following is a specification, reference being had to the accompanying drawings.

My invention relates specially to hangers whereby steam, gas, and water pipes are suspended from timbers, floor-beams, or any manner of supporting structure. The object of the invention is the construction of a hanger that will easily accommodate itself to any movement of the piping, either through the expansion or contraction of the piping, or through the settling of the building or structure within which it is placed.

My special improvement consists in the location of a hollow spherical ball-bearing at the end of a supporting lag-screw, stud, or equivalent primary support, within which, through a slot provided for that purpose, a suspending yoke is passed and rests upon the bottom, swinging equally well in all directions.

Referring to the drawings, Figures 1 and 2 represent views of a hanger embodying my improvements and adapted to the support of a single line of piping. Figs. 3 and 4 also represent views of a hanger embodying my improvements, but adapted to the support of two lines of piping. Figs. 5 and 6 are detail views of the hollow spherical ball-bearing provided with a lug, by means of which it is attached to the supporting lag-screw or its equivalent. Figs. 7, 8, and 9 represent detail views of yoke constructed to hook together at the bottom and open and shut to inclose the pipe. Fig. 10 represents an auxiliary stud or link, by means of which a second line of piping is supported. It shows also the lower hook-and-eye portions of the yoke hooked into said stud or link, also a hollow bearing screwed in place to receive the ball-bearing portion of the yoke.

Similar letters of reference designate like parts in all the figures.

The letter A designates portions of the suspended piping. In Figs. 1 and 3 the piping is in section. In Figs. 2 and 4 a longitudinal view of the piping is represented. A section of piping is also represented in Fig. 7 as ready for clasping within the yoke.

B is the yoke, here represented as hooked at the bottom and necked at the top to fit the inner surface-bearing of the hollow sphere, and with it constitute the complete ball-bearing. If preferred, this yoke may be in one piece, through which the pipe is passed upon original erection, or it may be fitted to open and receive the pipe after any of the well-known methods. As shown, the portions $b$ and $b'$ are provided with hooks and eyes to mate each other and inclose the pipe in a secure grasp. $b^3$ designates the upper portions of the yoke B, which being joined form the convex portion to wear within the hollow sphere C and form the ball-bearing. $b^4$ is a circular neck formed of the two portions of the yoke, and effects suspension through slot $c^2$ in sphere C between bearing $b^3$ and attached yoke.

In Fig. 5 dotted lines at $b^3$ represent the top portion of yoke as being passed through the shell of sphere C by the T-shaped slot outlined by $c'\,c^2\,c'$. After this bearing portion is passed through the slot it is lowered till it rests upon its seat at $c\,c$ on each side of slot $c^2$.

D designates a lag-screw in Figs. 1 and 2 and a suspension-bolt in Figs. 3 and 4. This lag-screw, bolt, or equivalent is designed to screw into the lug C' of the hollow sphere, both to hold the sphere in place and to furnish with the screwing up of the bolt or lag-screw a means of adjustment and control.

An auxiliary suspension lug or link is represented at D', and acts as a means of connecting the upper yoke in Figs. 3 and 4 with the lower sphere and associate yoke for the support of a second line of piping. Of course by providing proper strength at the top any number of rows of piping may be supported. Where the second line of piping is supported the two portions of the yoke B at $b$ and $b'$ are unhooked from each other and hooked into the auxiliary suspension-lug D' and the second hollow sphere C screwed upon the threaded portion $d$, and the second pair of yoke portions inserted to form the second ball-bearing.

What I claim as new, and desire to secure by Letters Patent, is—

1. In combination with a lag-screw, bolt, or equivalent support, a hollow slotted sphere attached thereto, and a pipe-yoke provided with an upper convex bearing-face, shaped and adapted to pass into the hollow slotted sphere from below without disturbing or removing it and to wear upon the inner bottom surface of said hollow slotted sphere, substantially as and for the purposes specified.

2. In combination with a lag-screw, bolt, or equivalent support, a hollow slotted sphere, C, attached thereto, and the divided yoke B, provided with the neck portions $b^4$ and bearing portions $b^3$ and adapted to pass within and wear upon the inner bottom surface of said sphere C, substantially as and for the purposes set forth.

3. In combination with a lag-screw, bolt, or equivalent support, hollow slotted spheres C, pipe-supporting yokes B, and an intermediate auxiliary support, D', connected to form a support for one or more lines of piping, substantially as set forth.

HARRY TRASK.

Witnesses:
WM. H. WEIGHTMAN,
F. M. HAVILAND.